United States Patent Office 3,391,095
Patented July 2, 1968

3,391,095
NORMALLY STABLE CURABLE EPOXY RESIN COMPOSITION CONTAINING ENCAPSULATED WATER INSOLUBLE AMINE CURING AGENTS
Alfred M. Tringali, Parsippany, John J. Maitner, Saddle Brook, and John E. Lynch, Emerson, N.J., assignors to Interchemical Corporation, New York, N.Y., a corporation of Ohio
No Drawing. Filed Sept. 20, 1965, Ser. No. 488,760
11 Claims. (Cl. 260—6)

ABSTRACT OF THE DISCLOSURE

A one package heat curable epoxy resin composition containing an encapsulated amine curing agent dispersed in the epoxy resin. The curing agents are prepared by encapsulating the amines by spray drying an aqueous dispersion of water-insoluble amine and a water soluble film former. The particular amines utilized are 2,6-di (dimethylaminomethyl) octyl phenol and 2,6-(dimethyl-aminomethyl)nonyl phenol.

---

This invention relates to stable epoxy resin compositions. More particularly, it relates to epoxy resin compositions which are normally stable but which already contain curing agent and may be cured without adding any further curing agent. Our invention provides a "one-package" curable epoxy resin composition.

Practical "one-package" curable epoxy resin compositions are very rare. A one "one-package" system is one which contains the curing agent for the epoxy resin but which is stable and may be stored for long periods of time prior to use. Conventionally, epoxy resin compositions containing the curing agent have been found to be highly unstable.

Accordingly, in all existing commercial processes using epoxy resins, it is necessary to mix the curing agent with the epoxy resin just prior to use. The disadvantages of such a procedure are obvious. Among them are the need to store and keep inventories of two separate items and more important, the requirement that the ultimate user also be a formulator. The results have to depend on the user's skill as a formulator.

We have now discovered a novel "one-package" stable but curable epoxy dresin composition which already contains the curing agent for the epoxy resin but which does not cure or change in any way on storage. It may be stored for periods in excess of six months at ambient conditions.

In accordance with our invention, there is provided a curable epoxy resin having dispersed therein particles of an amine, either 2,6-di(dimethylaminomethyl) octyl phenol or 2,6-di(dimethylaminomethyl) nonyl phenol completely enclosed or encapsulated in a coating of a water soluble polymeric film-former. This one package system may be cured through the application of heat or moisture (which dissolves the coating) or a combination of both.

The dispersed particles are prepared by a novel process for completely enclosing or encapsulating the amines in the water soluble polymeric film-former. The process is based upon the unexpected in solubility of 2,6-di(dimethylaminomethyl) octyl phenol or 2,6-di(dimethylaminomethyl) nonyl phenol in water. Applicants do not believe that there are any other known amine catalyst for epoxy resins which are water-insoluble. The amines of this invention are dispersed in a solution of a polymeric film-former in water. Then, the dispersion is spray dried to remove substantially all of the water. The resulting particles are the particles of amine completely enclosed or encapsulated in a coating of the film former. The coated particles are then dispersed in epoxy resins in the conventional ratios of amine to epoxy resins used in the curing of epoxy resins e.g., preferably in the order of from 2 to 10 parts of amine for each 100 parts of epoxy resin. The resulting composition is a highly stable "one-package" curable epoxy resin composition.

It will be obvious that the coated particles of this invention may be used to cure any of the conventional epoxy resins which are amine-curable; that is materials possessing more than one vicinal epoxy group, i.e., more than one

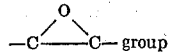
—C——C— group

These compounds may be saturated or unsaturated, aliphatic, cycloaliphatic, aromatic or heterocyclic and may be substituted with substituents, such as chlorine, hydroxyl group, ether radicals and the like.

Various examples of polyepoxides that may be used in the process of the invention are given in U.S. 2,633,458. Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, semseed, sardine, cottonseed oil, and the like.

Another group comprises the diglycidyl esters of dibasic acids such as adipic, pimelic, suberic, azelaic, sebacic, maleic, phthalic, terephthalic, isophthalic and the like.

Another group of the epoxy-containing materials which may be used in this invention includes the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxybutyl) tetrahydrophthalate, di(4,5-epoxydodecyl) maleate, di(2,3-epoxybutyl) tetraphthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) - 1,2,4 - butanetricarboxylate, di(5,6-epoxypentadecyl) tetrate, di(4,5-epoxytetradecyl) maleate, di (2,3-epoxybutyl) azelate, di(3,4-epoxybutyl) citrate, di (5,6-epoxyoctyl) cyclohexane-1, 3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10, 11-diethyl-8,9,12,13-diepoxy-eicosanedioate, dihexyl 6,7,10,11-diepoxyhexadecanedioate, didecyl cyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene styrene copolymers and the like.

Most preferably the polyepoxides used in this invention are resins produced by the reaction of a polyhydric phenol, particularly 2,2-bis(4-hydroxyphenyl) propane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of 2,2-bis(4-hydroxyphenyl) propane, a higher weight polyepoxide resin may be produced. The polyepoxide resins produced by the reaction of epichlorohydrin and 2,2-bis(4-hydroxyphenyl) propane may in addition be esterified with vegetable oil fatty acids including coconut acids, cottonseed acids, dehydrated castor fatty acids, linseed oil fatty acids, oiticia fatty acids, soy acids and tung fatty acids.

With respect to the polymeric film-former, it may be any polymeric material natural or synthetic which can form a film and is soluble in water. Also the film-former must be unreactive with the two amines used in this invention. Some suitable film-formers include hydroxy ethyl cellulose, gelatin, polyvinyl alcohol and partially hydrolyzed polyvinyl acetate.

Preferably the dispersed particles contain from 1 to 4 parts of the amine for each part of coating. (In this application, all proportions are by weight unless otherwise specified.)

Example 1

2,6-di(dimethylaminomethyl) octylphenol is prepared in accordance with the procedure of U.S. Patent No. 2,033,092, Example 4(b). ($\alpha,\alpha,\gamma,\gamma$-tetramethyl-butyl-phenol is the same as p-octylphenol).

Then 14 parts of 2,6-di(dimethylaminomethyl) octyl phenol are emulsified into 70 parts of a 10% solution of hydroxy ethyl cellulose. To form a stable emulsion with a particle size range of 12 to 25 microns diameter the emulsion is then fed to a spray drier operating under an inlet temperature of 400° F. and an outlet temperature of about 240° to 280° F. and the emulsion is spray dried in said drier. The resulting dry powder is removed from the drier and washed in heptane to remove free amine which may be present. The resulting particles have a size range of from 1 to 100 microns diameter and contain about a 1:1 ratio of the amine to the binder. The particles are then amine coated or encapsulated with the hydroxy ethyl cellulose binder.

1 part of the resulting particles are thoroughly dispersed in 10 parts of Epon 828 (an epoxy resin produced by the reaction of Bisphenol A (2,2-diphenol propane) and epichlorohydrin having an epoxy equivalent weight of 175–210 and a melting point of 8–12° C. This composition may be stored for several months without any change or deterioration. This composition may be used as an effective adhesive by applying the same and curing for 30 minutes at 350° F.

Example 2

Example 1 is repeated using the same procedure, ingredients, conditions and proportions except gelatin is used in place of the hydroxy ethyl cellulose. The resulting particles comprise the 2,6-di(dimethylaminomethyl) octyl phenol coated with the gelatin. The particles contain about a 3:1 gelatin amine ratio.

The coated particles when dispersed in the epoxy resin in accordance with the procedure of Example 1 provide a curable composition having about the same stability as the composition of Example 1.

This example may be repeated using water soluble polyvinyl alcohol or polyvinyl acetate in place of the gelatin.

Example 3

Example 1 is repeated using the same ingredients, proportions, conditions and procedure except that in place of 2,6-di(dimethylaminomethyl) octyl phenol, there is used 2,6-di(dimethylaminomethyl) nonyl phenol prepared by the same procedure. The results are the same as in Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A normally stable, heat curable composition comprising a curable epoxy resin having dispersed therein particles comprising an amine selected from the group consisting of 2,6-di-(dimethylaminoethyl) octyl phenol and 2,6-di(dimethylaminomethyl) nonyl phenol completely enclosed in a coating of a water-soluble polymeric film former.

2. The composition of claim 1 wherein said amine is 2,6-di(dimethylaminomethyl) octyl phenol.

3. The composition of claim 1 wherein said amine is 2,6-di(dimethylaminomethyl) nonyl phenol.

4. The composition of claim 1 wherein said film former is hydroxyl ethyl cellulose.

5. The composition of claim 1 wherein said film former is gelatin.

6. The composition of claim 1 wherein said epoxy resin is the reaction product of epichlorohydrin and 2,2-diphenol propane.

7. A process for completely enclosing an amine selected from the group consisting of 2,6-di(dimethylaminoethyl) octyl phenol and 2,6-di(dimethylaminomethyl) nonyl phenol in a coating of a polymeric film former which comprises dispersing said amine in a solution of the film former in water and spray drying the resulting dispersion to substantially eliminate the water.

8. The process of claim 7 wherein said amine is 2,6-di(dimethylaminomethyl) octyl phenol.

9. The process of claim 7 wherein said amine is 2,6-di(dimethylaminomethyl) nonyl phenol.

10. The process of claim 7 wherein said film former is hydroxy ethyl cellulose.

11. The process of claim 7 wherein said film former is gelatin.

References Cited

UNITED STATES PATENTS

| 2,636,859 | 4/1953 | Entwistle et al. | 252—42.4 |
| 3,016,308 | 1/1962 | Macaulay | 252—316 |
| 2,977,332 | 3/1961 | Zumstein | 260—47 |
| 3,018,258 | 1/1962 | Meier et al. | 260—47 |
| 3,131,068 | 4/1964 | Greif et al. | 117—100 |

OTHER REFERENCES

Thiokol, Bulletin PE-12, "Epoxy Hardeners," January 1962.

WILLIAM H. SHORT, *Primary Examiner.*

LOUISE P. QUAST, *Examiner.*

E. M. WOODBERRY, *Assistant Examiner.*